United States Patent Office 2,715,048
Patented Aug. 9, 1955

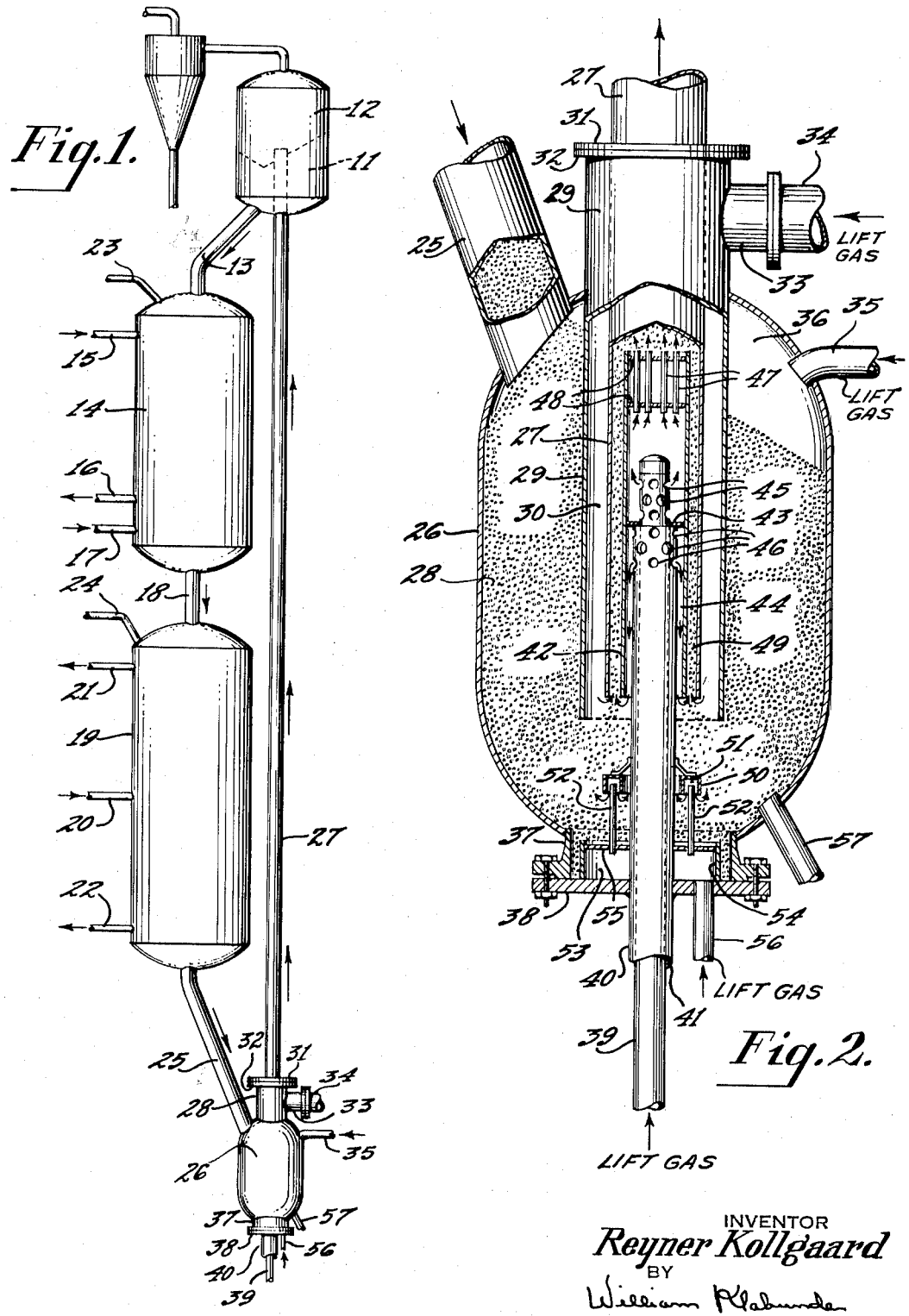

2,715,048

METHOD AND APPARATUS FOR ELEVATING GRANULAR MATERIAL

Reyner Kollgaard, Media, Pa., assignor to Houdry Process Corporation, Wilmington, Del., a corporation of Delaware Application October 17, 1950, Serial No. 190,555

11 Claims. (Cl. 302—53)

This invention relates to a method and apparatus for elevating granular material by means of a gaseous lift medium through an elongated confined lift path extending upwardly between the terminal points of a downflow path through which the granular material gravitates in a cyclic procedure. In particular, the invention is applicable to hydrocarbon conversion or other chemical processing systems wherein granular contact material, which may be of a catalytic nature, is passed downwardly by gravity flow through one or more contact zones in which desired reactions may be carried out, or in which other treatment of the granular material may be effected, and is then elevated for reuse.

In pneumatic lifts so employed, it is a common practice to employ an elongated pipe for the confined lift path with vessels or hoppers at the lower and upper ends thereof to provide, respectively, an introduction zone wherein the granular material is engaged by the gaseous lift medium and carried thereby into and upwardly through the lift pipe, and a disengaging zone wherein the elevated contact material is separated from the lift gas and returned to the downflow path.

A typical example of a system to which the present invention may be advantageously applied is illustrated and described in an article entitled "Houdriflow: New design in catalytic cracking," appearing at page 78 of the January 13, 1949, issue of the "Oil and Gas Journal."

The invention will hereinafter be described and illustrated in connection with a system of the foregoing type, although it is not to be construed as limited thereto. Briefly, the above-cited article discloses a catalytic cracking system for refining hydrocarbons which comprises superimposed reaction and regeneration vessels connected serially to provide a continuous downflow path for catalytic contact material in the form of granules, beads, or pellets. The catalyst is supplied to the downflow path from an upper lift hopper disposed at an elevation substantially above the uppermost vessel, containing the reaction zone, and after passing through the system is withdrawn from the lowermost vessel, containing the regeneration zone, and passed downwardly into a lower lift hopper. Within the reactor and the regenerator the catalyst gravitates as a compact, non-turbulent, moving bed and within the connecting conduits the catalyst gravitates in the form of a compact moving column.

The lower lift hopper constitutes an introduction chamber comprising an engaging zone wherein the catalyst, continuously supplied from the lower discharge end of the downflow path, is engaged by the stream of lift gas, separately introduced, and conveyed thereby into the lower end of the lift pipe. The lower end of the lift pipe is situated at a low point within the introduction chamber, and is continuously submerged within a moving bed of catalyst. The lift pipe extends upwardly to a point well within the upper lift hopper, so that catalyst discharging from the upper end of the lift pipe and separated from the lift gas may settle to form a moving bed in the lower region of the disengaging zone.

In the operation of pneumatic lifts for elevating catalyst in bead or pellet form having, for example, a particle size of about 0.05 to 0.5 inch in diameter, one of the principal problems, especially when particle velocities up to about 30–40 feet per second are employed, is to avoid excessive attrition of the beads or pellets. Turbulence of the catalyst stream within the lift pipe or at the points of introduction thereto or discharge therefrom tends to cause attrition of the catalyst particles by reason of violent inter-particle contact and impact between the catalyst particles and the inner surfaces of the equipment. When the broken or attrited particles are of a size smaller than the minimum size desired for effective and efficient operation, means are employed for rejecting them from the system and replacing them with fresh catalyst. The attrition, therefore, in representing a direct loss of contact mass to the operation is an important factor in the overall economics of that operation. Such attrition losses as may occur within the introduction zone are most effectively minimized when the catalyst is conveyed through the zone of rapid acceleration at the mouth of the lift pipe as a smooth flowing stream of relatively uniform particle distribution.

The present invention is directed to a method, and apparatus for carrying out the same, by which the catalyst may be introduced into the lift pipe as a relatively smooth flowing stream with a minimum of inter-particle or particle-to-vessel impact, so that attrition of the particles and erosion of the equipment may be kept within low and economical limits.

In accordance with the invention, granular material from the downflow path is passed continuously into the upper region of the introduction chamber, where it forms a compact non-turbulent bed gravitating about and below the lower end of the lift pipe. The lower end of the lift pipe is centrally obstructed for a substantial portion of its length so as to form an elongated annular inlet path for the granular material entering the lift pipe. At the upper end of the central obstruction the lift path expands to the full flow area of the lift pipe. Lift gas is introduced into the introduction chamber at three separate places to engage the granular material and to convey it into and upwardly through the lift pipe. First, the lift gas which initially engages the granular material is introduced into the moving bed at one or more points remote from the lift inlet, which may be above the surface of the bed or at any point therein, such as below the end of the lift pipe, whereby the granular material is conveyed as a low velocity stream upwardly to the annular inlet path formed between the lower end of the lift pipe and the central obstruction. Second, as the granular material moves into annular stream formation in passing from the bed into the lift pipe inlet, it is engaged interiorly and exteriorly by peripheral streams of lift gas which impart sufficient additional energy to the granular material to accelerate its movement into and upwardly through the lift pipe. Preferably, though not necessarily, the interior and the exterior streams of peripheral lift gas are circumferentially complete streams. And third, at the point where the stream of material changes from annular to circular cross-sectional area, lift gas in sufficient quantity to avoid substantial velocity reduction is introduced in an upward direction into the lift path, substantially parallel to the direction of flow of the granular material.

In a preferred embodiment of the invention, the bed gas, that is, gas entering the bed remote from the lift inlet and moving concurrently therewith, is introduced both at the upper surface of the bed and in the lower region of the bed beneath the lift pipe, although, if desired, only one such place of introduction may be employed. The bed gas constitutes a minor or secondary portion of the total lift gas, and is introduced in total quantity sufficient only to elevate the granular material into the annular inlet path. The outer and the inner peripheral streams of lift gas are introduced laterally adjacent the lower edges of the members defining the annular inlet path, and are directed downwardly, so that in reversing their direction of flow under the lift pipe and the central obstruction, respectively, they impart additional energy to the granular material entering the inlet. The stream of lift gas introduced about the outer periphery of the annular stream of material entering the lift path constitutes the major portion of the total lift gas, the quantity thereof being such as to rapidly accelerate the movement of granular material into and through the lift path, with consequent reduction in particle concentration. The stream of lift gas introduced about the inner periphery of the annular stream of material entering the lift path constitutes an additional minor or secondary portion of the total lift gas. The latter gas has a dual purpose, in that it assists in creating a smooth uniform flow of the granular material into the annular inlet path with good particle distribution of the solids in the gas stream, and it provides a cushion of gas along the surfaces of the central obstructing member. The latter member, in occupying the central portion of the lift inlet, prevents the formation of a central core of slowly moving catalyst at the bottom of the lift pipe as a result of the lateral movement of the granular material toward the axis of the lift pipe. The cushion of gas provided by the inner peripheral stream prevents excessive impingement of the laterally moving solid particles against the central member.

It is to be noted, however, that the major lifting effect is provided by the outer peripheral stream of gas, and that the stream or streams of bed gas together with the inner peripheral stream constitute a minor portion of the total gas, insufficient in quantity to elevate the granular material through the lift pipe. The bed gas provides a convenient process control whereby the flow rate of granular material may be controlled. Either or both of the bed gas streams may be used to effect such control. At the point above the central obstruction where the flow path changes from annular to circular cross-section there is a substantial increase in flow area tending to effect a substantial decrease in particle velocity with attendant increase in particle concentration. To avoid or minimize such effect, additional lift gas is introduced at the point of increased flow area. Such additional lift gas is preferably introduced as an upwardly directed stream discharging from the upper end of the central obstruction forming the annular portion of the lift path. It is also a feature of the invention that such additional lift gas is introduced in a manner to produce substantially axial flow with a minimum of lateral movement or turbulence so that there may be a gradual transformation of the stream of solid particles from annular to circular flow.

For a fuller understanding of the invention reference may be had to the accompanying drawing forming a part of this application, in which:

Fig. 1 diagrammatically illustrates a hydrocarbon conversion system, including a gas lift for circulating granular material, to which the method and apparatus of the invention may be applied; and Fig. 2 is an enlarged sectional elevation of the lower lift hopper, or introduction chamber, illustrating the method and apparatus by which the granular material is engaged by the lift gas and conveyed therewith upwardly into and through the lift pipe.

Referring to the embodiment illustrated in the drawing, Fig. 1 shows a typical hydrocarbon conversion system in which contact material, such as catalyst in the form of granules, pellets, etc., flows downwardly by force of gravity as a compact moving bed 11 in the lower region of an upper lift hopper 12, the latter comprising the disengaging zone referred to hereinafter. The catalyst is continuously withdrawn from upper lift hopper 12 as a compact moving column through a seal leg 13 and is passed into the upper end of a reaction chamber 14 wherein, in known manner, the catalyst gravitates as a compact moving bed while being contacted with gaseous reactants introduced into the reaction chamber, as through inlet 15, to carry out the desired conversion. The gaseous products of reaction are separated from the catalyst in the lower portion of the chamber 14, the former being withdrawn from the vessel, as through outlet 16, and passed to subsequent treating sections of the system, not shown. The latter, bearing a carbonaceous deposit thereon, is stripped of vaporizable hydrocarbon material in conventional manner by contact with stripping gas introduced in the bottom of the chamber 14, as through inlet 17, and is then withdrawn from the chamber as a compact moving column through seal leg 18.

The stripped, spent catalyst is passed through seal leg 18 into the upper end of a regenerator 19, wherein the contaminated material is contacted with a combustion-supporting gas, introduced into the regenerator through inlet line 20, to burn off the carbonaceous deposit. The catalyst gravitates as a compact moving bed through the regenerator 19. Since inlet line 20 is connected to the regenerator at an intermediate level, the flow of gas and solids will be countercurrent in the upper region of the vessel and concurrent in the lower region thereof. The gaseous products of combustion, or flue gas, are withdrawn from the regenerator 19, as by outlet lines 21 and 22, and disposed of in the usual manner. A portion of the flue gas may be employed as a gaseous lift medium for returning the catalyst to the upper lift hopper, as will presently be described. Following conventional practice, seal gas may be introduced into the upper region of reactor 14 and regenerator 19 through inlet lines 23 and 24, respectively.

The regenerated catalyst is withdrawn from the bottom of regenerator 19 as a compact moving column through seal leg 25, and is passed into a lower lift hopper 26 which provides an introduction chamber or engaging zone wherein the catalyst is engaged by a lift gas, such as air, steam, etc., or by flue gas withdrawn from the regenerator through outlets 21 and 22, and conveyed upwardly through a lift pipe 27 to the upper lift hopper 12.

For a clear illustration of a method and means by which, in accordance with the invention, such engagement of lift gas and catalyst, and conveyance of the same into and through a lift pipe, may be effected, reference may be made to Fig. 2 of the drawing, which shows an enlarged sectional view of the interior of the lower lift hopper or introduction chamber 26.

In the embodiment of the invention illustrated in Fig. 2, the lift pipe 27 extends through an opening provided in the upper end wall of the lower lift hopper 26, and terminates in the lower region thereof at a level sufficiently above the bottom of the hopper to permit catalyst introduced in the upper region of the chamber to gravitate as a compact non-turbulent bed 28 around and below the open lower end of the lift pipe.

The lower end of the lift pipe 27 is surrounded by a spaced concentric sleeve 29 which extends upwardly from a point adjacent, either above or below, the lower end of the lift pipe through the opening in the upper end of the lift hopper to a point above the lift hopper, thus forming an annular passage 30 between the sleeve and the lift pipe. The upper end of annular passage 30 is sealed, as by a cover plate 31 attached to a flange 32 on the upper end of the sleeve. A side inlet 33 is provided at the upper end of sleeve 29 through which primary lift gas may be supplied from a conduit 34 connected to a gas source, not shown. As stated, the source of such primary lift gas may be the flue gas outlet from the regenerator 19.

Lift gas is additionally supplied to the introduction zone through conduit 35 connected to the source which supplies lift gas to conduit 34, or to any other source, not shown. Conduit 35 discharges into the catalyst-free space 36 at the upper end of the lower lift hopper above the surface of the bed 28, the catalyst inlet 25 being so positioned that the surface of the catalyst, while assuming its normal angle of repose within the chamber, falls below the lift gas inlet line 35. The lift gas, or bed gas, supplied through conduit 35 enters the bed 28 through its upper surface and travels downwardly about the sleeve 29 concurrently with the catalyst to the lower region of the chamber, where it passes inwardly toward the axis of the lift and then upwardly toward the mouth of the lift pipe. While the bed gas is effective to assist in elevating the catalyst to the lift inlet, it is not supplied in sufficient quantity to elevate the catalyst through the lift pipe. Catalyst movement thus effected is therefore at relatively low velocity.

The lower end of introduction chamber 26 is provided centrally with a relatively wide flanged nozzle or connector 37 closed by a removable cover plate 38 secured thereto in conventional manner.

A conduit 39 extends upwardly along the axis of the lift pipe 27, passing centrally through cover plate 38 and terminating a substantial distance within the sleeve-encased portion of the lift pipe. A second conduit 40, concentrically surrounding and radially spaced from the conduit 39, extends therewith through cover plate 38 and upwardly into the lift pipe, terminating below the upper end of conduit 39. The annular space 41 between the conduits 39 and 40, and the conduit 39, form separate passages for the introduction of lift gas from one or more external sources, not shown.

A concentric, spaced sleeve 42 surrounds the upper end of conduit 40, extending from the lower end of the lift path to a point substantially above the upper end of conduit 39.

A horizontal flat annular ring 43 secured to the upper end of conduit 40 extends radially inwardly and outwardly thereof to seal the upper ends of annular passage 41, and of annular passage 44 formed between conduit 40 and sleeve 42, and to rigidly support the sleeve member 42.

The upper end of conduit 39 is capped, and a series of side discharge ports 45 are provided therein so that lift gas may be introduced into the upper section of sleeve 42 above the annular ring 43. A series of side discharge ports 46 are also provided at the upper end of conduit 40 so that lift gas may pass from the upper end of annular passage 41 into the upper end of annular passage 44 for conveyance downwardly through the latter and discharge therefrom into the moving bed of granular material as an annular stream surrounding conduit 40. Lift gas discharging from the upper end of conduit 39 through ports 45 passes upwardly through the upper section of sleeve 42 and is discharged centrally within the lift pipe 27 through a series of parallel tubes 47 supported in the upper end of sleeve 42 by tube sheets 48, and arranged with their axes parallel to the axis of the lift pipe.

Sleeve 42 has an outside diameter substantially smaller than the inside diameter of lift pipe 27, so that the annular passage 49 therebetween provides a suitable cross-section flow area for conveying granular material in desired quantity into the lift pipe proper.

Lift pipe 27, conduits 39 and 40, and sleeve members 29 and 42 are concentrically arranged, and supported as a unitary rigid structure. To assure that such concentricity is maintained during operation of the lift, spacers, not shown, may be placed in conventional manner in the annular gas passages 30, 41, and 44. If desired, spacers may also be provided within the annular inlet portion 49 of the lift pipe, due consideration being given to the problem of erosion caused by the rapidly moving stream of solid particles.

In the lower region of the moving bed 28 an annular channel member 50 is supported in inverted position by the conduit 40, the channel being concentric to and radially spaced from the conduit 40. An annular hollow space 51 is thus provided within the moving bed 28 into which lift gas may be introduced through a series of risers 52 supplied with lift gas from a plenum chamber 53 at the bottom of the lift hopper. Plenum chamber 53 is formed by a cylindrical member 54 attached along its lower perimeter to the upper surface of cover-plate 38, and closed at its upper end by an end-plate 55. The lower ends of risers 52 are rigidly set in the end-plate 55, and the upper ends terminate within the hollow annular space.

Lift gas is introduced into plenum chamber 53 through inlet line 56 in the cover-plate 38. The lift gas passes from chamber 53 upwardly through risers 52 into the hollow annular space 51, escaping from the latter by passing under the inner and outer edges of the channel and then rising or diffusing upwardly through the portion of moving bed 28 immediately below the lift inlet.

Since the conduit 40, its associated sleeve 42, and the elements of apparatus associated with the introduction of diffuser gas through channel 50 are all supported as a unitary structure on cover-plate 38, they may readily be removed therewith for the purposes of inspection, repair, or replacement.

If for any reason it is desired to remove a portion of the granular material from the lift hopper 26, such removal may be effected through drain pipe 57 in the lower wall of the hopper.

During operation of the lift, the catalyst gravitating concurrently with the lift gas introduced as bed gas through line 35 passes inwardly in the lower region of the introduction chamber under the lower end of sleeve member 29, where it is engaged by diffuser gas rising from under the channel 50. The combined streams of bed gas and diffuser gas elevate the granular material toward and into the annular mouth of the lift pipe, that is the lower end of annular passage 49, the total quantity of gas so introduced being of minor amount insufficient of itself to elevate the granular material through the lift pipe.

As the stream of granular material enters the annular mouth of the lift pipe it is engaged along its outer and its inner peripheries by streams of lift gas discharging downwardly from annular passages 30 and 44, respectively. The outer peripheral lift gas is introduced in sufficient quantity to rapidly accelerate the movement of the material upwardly along the lift path, such gas constituting the major portion of the total lift gas introduced into the lift hopper. The inner peripheral lift gas is introduced in minor amount, and serves to straighten out the flow of material carried inwardly toward the axis of the lift and to deflect the same away from the outer wall surfaces of the conduit 40 and the sleeve 42 in the region of the inlet, so that undesirable turbulence, and impingement of the solid particles on such surfaces, is minimized.

Under the influence of the combined streams of bed gas, diffuser gas, outer peripheral gas and inner peripheral gas, as hereinbefore defined, the granular material moves upwardly through annular passage 49 at substantially increased velocity and decreased particle concentration.

At the upper end of annular passage 49 the cross-section flow area of the lift pipe increases abruptly, so that there is a tendency toward a substantial decrease in velocity with attendant turbulence. In accordance with the invention, additional lift gas is introduced at the level of increased flow area in order to avoid undesirable turbulence. The additional lift gas is discharged from the group of risers 47 in an axial direction, and preferably in such amount as to substantially compensate for the change in flow area.

After engagement of the rising stream of material by lift gas discharging from risers 47 the granular material is conveyed by the total mixture of lift gas at substantially increased velocity upwardly through the entire lift pipe 27 and is discharged from the upper end thereof into the upper lift hopper 12. Within hopper 12 the lift gas may be separated from the granular material in known manner, the latter settling to form the moving bed 11 and the former being discharged from the hopper or disengaging zone in conventional manner.

The described method and arrangement of apparatus provides a smooth uniform flow of granular material in the region of the lift inlet and upwardly through the lift pipe with a minimum of turbulence and impingement against the wall surfaces which direct or confine the movement of catalyst. By reason thereof there is obtained a substantial lowering of attrition losses.

Exemplifying a commercial application of the system of the present invention there may be employed a lift pipe height of several hundred feet, a lift pipe diameter of 10-24 inches, and an introduction of lift gas in sufficient quantity to elevate 100-400 tons/hr. of granular material, such as bead catalyst, having a particle size of 0.05-0.5 inch in diameter. The gas pressure at any of the points of introduction into the lift hopper or into the lift pipe may be in the range of 1-10 lbs./sq. in. gauge, and the discharge velocity of the catalyst leaving the lift pipe may be about 25-45 ft./sec. Average particle concentrations within the lift may be about 1-7 lbs./cu. ft.

I claim as my invention:

1. A method for elevating granular material through an upwardly extending confined lift path by means of a gaseous lift medium which comprises the steps of passing said material downwardly as a confined compact moving bed about and below the lower end portion of said lift path, introducing lift gas into said bed at a substantial distance from the inlet end of said lift path to convey said material at low velocity to said inlet, passing said material into and along the initial portion of said lift path as a confined annular stream of smaller flow area than the flow area along the remaining portion of said lift path, introducing lift gas at the lower end of said annular stream along the inner and outer peripheries thereof to effect a substantial increase in the velocity of said material, and introducing lift gas into the lift path adjacent the upper end of said annular stream to avoid a substantial reduction in velocity of the material entering said remaining portion of the lift path.

2. A method as defined in claim 1 in which said lift gas introduced into the lift path adjacent the upper end of said annular stream is directed upwardly parallel to the axis of said lift path.

3. A method as defined in claim 2 in which the lift gas peripherally introduced at the lower end of said annular stream is directed downwardly into the portion of said bed below said lift path.

4. A method as defined in claim 1 in which said lift gas introduced into the lift path adjacent the upper end of said annular stream is introduced centrally thereof.

5. A method as defined in claim 4 in which said centrally introduced lift gas discharges upwardly into the remaining portion of said lift path parallel to the axis of said lift path.

6. Apparatus for elevating granular material through an upwardly extending lift pipe comprising a chamber surrounding the lower end portion of said lift pipe to provide a confined path for passing said granular material as a compact moving bed downwardly about and below said lift pipe, means remote from the inlet end of said lift pipe for introducing lift gas into said moving bed, means for introducing lift gas into said moving bed in a confined stream discharging downwardly adjacent and about the lower perimeter of said lift pipe, a hollow tubular member concentrically arranged within the lower end portion of said lift pipe and spaced therefrom to form an annular inlet path, said member being internally partitioned into upper and lower hollow sections, and means for introducing lift gas into said hollow sections, the lift gas in said upper hollow section discharging from the upper end thereof axially upward along said lift path, and the lift gas in said lower hollow section discharging from the lower end thereof downwardly into said bed.

7. Apparatus for elevating granular material through an upwardly extending lift pipe comprising a chamber surrounding the lower end portion of said lift pipe to provide a confined path for passing said granular material as a compact moving bed downwardly about and below said lift pipe, an outer spaced sleeve about said lift pipe extending from a point adjacent the lower end thereof upwardly to a point above the upper end of said chamber, a conduit extending upwardly along the axis of said lift pipe from a point below the lower end of said chamber to a point well within said lift pipe, an inner spaced sleeve concentrically positioned between said conduit and said lift pipe and extending from the lower end of said lift pipe to a point above the upper end of said conduit, a transverse annular partition extending between the sides of said conduit and said sleeve member and separating the latter into upper and lower hollow sections, a second conduit concentrically surrounding and spaced from the first-mentioned conduit extending therewith into said chamber and terminating adjacent the upper end of said lower hollow section, said first and second conduits being in open communication, respectively, with said upper and lower hollow sections, a plurality of elongated conduits supported in the upper end of said upper hollow section with their axes parallel to the axis of said lift pipe and providing open communication between said upper hollow section and said lift pipe, and inlet means in the walls of said chamber remote from the lower end of said lift pipe.

8. Apparatus as defined in claim 7 in which said inlet means remote from the lower end of said lift pipe is located at both the upper end and lower ends of said chamber.

9. Apparatus as defined in claim 8 in which said inlet means at the lower end of said chamber comprises an annular inverted channel member within said bed concentrically encircling said conduits, and means for introducing lift gas into the hollow space beneath said annular channel member.

10. Apparatus as defined in claim 9 in which said means for introducing lift gas into the hollow space beneath said channel member comprises a plenum chamber in the lower end of said chamber, means for introducing lift gas into said plenum chamber, and a plurality of conduits communicating at their lower ends with said plenum chamber and having their upper ends terminating within said hollow space.

11. Apparatus for elevating granular material through an upwardly extending lift pipe comprising a chamber surrounding the lower end portion of said lift pipe to provide a confined path for passing said granular material as a compact moving bed downwardly about and below said lift pipe, means remote from the end of said lift pipe for introducing lift gas into said moving bed, means for introducing lift gas into said moving bed in a confined stream discharging downwardly adjacent and about the lower perimeter of said lift pipe, a hollow tubular member concentrically arranged within the lower end portion of said lift pipe and spaced therefrom to form an annular lift path, said member being internally partitioned into upper and lower hollow sections, and means for introducing lift gas into said lower hollow section, the lift gas in said lower hollow section discharging downwardly and outwardly into said bed, said material being carried upwardly through said annular path by said lift gases.

References Cited in the file of this patent

UNITED STATES PATENTS

| 528,417 | Duckham | Oct. 30, 1894 |
| 1,364,532 | Von Porat | Jan. 4, 1921 |
| 2,541,077 | Leffer | Feb. 13, 1951 |

FOREIGN PATENTS

| 82,016 | Switzerland | Oct. 16, 1919 |
| 180,397 | Great Britain | May 11, 1922 |